United States Patent [19]

Andrews et al.

[11] Patent Number: 4,701,795

[45] Date of Patent: Oct. 20, 1987

[54] METHOD AND MEANS TO ELIMINATE INTERACTION BETWEEN CLOSELY LOCATED CATHODE RAY TUBES

[75] Inventors: Edward W. Andrews, Brookfield; Roy A. Schley, Milwaukee, both of Wis.

[73] Assignee: General Electric Company, Milwaukee, Wis.

[21] Appl. No.: 794,676

[22] Filed: Nov. 4, 1985

[51] Int. Cl.⁴ .............................................. H04N 5/06
[52] U.S. Cl. .................................. 358/150; 358/149; 358/160
[58] Field of Search ............... 358/148, 149, 160, 150, 358/151, 158, 185; 340/717, 814

[56] References Cited

U.S. PATENT DOCUMENTS

| | | | |
|---|---|---|---|
| 4,346,407 | 8/1982 | Baer et al. | 358/149 |
| 4,425,581 | 1/1984 | Schweppe et al. | 358/149 |
| 4,489,348 | 12/1984 | Lepley | 358/149 |
| 4,611,228 | 9/1986 | Machida et al. | 358/149 |

FOREIGN PATENT DOCUMENTS

| | | | |
|---|---|---|---|
| 737847 | 12/1954 | United Kingdom | 358/149 |
| 2085257 | 4/1982 | United Kingdom | 358/160 |

*Primary Examiner*—James J. Groody
*Assistant Examiner*—David E. Harvey
*Attorney, Agent, or Firm*—James H. Beusse; Douglas E. Stoner

[57] ABSTRACT

A method and apparatus for generating a video display from an independent controllable video source in synchronism with an external video signal for eliminating electromagnetic interference between closely positioned cathode ray tube display monitors, each display monitor being connected to display a corresponding one of the two video signals. The system eliminates the electromagnetic interference by forcing the vertical retrace functions in the closely positioned monitors to occur simultaneously. In one form the system includes apparatus for stripping a vertical sync signal from an externally generated video signal and for applying that vertical signal to a comparator for comparison against an internally generated vertical sync signal used to control the video presentation from the independent video source. The comparator generates an error signal representative of the time difference between the two signals which error signal is then used to vary the frequency of a controllable clock in such a manner that the two vertical sync signals are forced to occur simultaneously. The controllable clock is also used to generate horizontal sync signals and other signals required in order to produce video at a rate suitable for application in a video monitor. The horizontal and vertical sync signals are summed with the video information to form a composite video signal.

5 Claims, 6 Drawing Figures

METHOD AND MEANS TO ELIMINATE INTERACTION BETWEEN CLOSELY LOCATED CATHODE RAY TUBES

BACKGROUND OF THE INVENTION

The present invention relates to video monitors and, more particularly, to a method and apparatus for eliminating magnetic field interaction between closely positioned video monitors.

There are many instances in which it is desireable to have more than one video monitor in close physical proximity to another. In medical equipment, such as x-ray equipment, it has also become popular to utilize multiple monitors. Typically, one monitor will be an image display monitor and another will be an alpha-numeric (A/N) display monitor. Both types of monitors use standard cathode ray tube (CRT) displays and have essentially identical electron beam control systems using magnetic fields generated by electromagnets or yokes mounted about a neck of the CRT. As will be appreciated, when any two monitors are closely positioned, the magnetic field generated in one monitor may adversely effect the display on an adjacent monitor. This "cross-talk" effect is most noticeable when vertical retrace in one monitor occurs at a different time than a vertical retrace in another and generally appears as a horizontal distortion on one or both of the video displays.

The prior art has attempted to minimize the effect of magnetic interaction by providing magnetic shielding around the necks of CRT's in monitors designed to operate adjacent other monitors. Such shielding increases the cost of a monitor. Other attempts to alleviate the problem have involved the use of higher quality, and more costly, electromagnets and associated drive circuitry to generate a more controlled or tightly defined and shaped magnetic field.

Although the interaction between monitors may occur when driven by identical but unsynchronized video signals, the interaction is more exacerbated when one monitor operates at a different scan rate or frame rate than another. In the medical example above, the x-ray image display data is typically provided as standard 525 line video date; however, the A/N display data is typically provided in a 263 lines per frame, non interlaced video signal format. In displaying these different video formats on adjacent monitors, the vertical retrace in the A/N monitor typically disturbs the video image quality as displayed on the image monitor.

It is an object of the present invention to provide a method and apparatus for eliminating electromagnetic interference between closely positioned video monitors when driven by different video formats.

It is a further object of the present invention to provide a method and apparatus for eliminating electromagnetic interference between closely coupled video monitors without the use of magnetic shielding.

SUMMARY OF THE INVENTION

In accordance with one aspect of the invention, a video image display monitor and an A/N display monitor are synchronized to a common vertical retrace cycle in order to render any electromagnetic cross-talk invisible. The synchronization is achieved by stripping the vertical sync pulses from the image data supplied to the image monitor and supplying the stripped vertical sync pulses to the A/N monitor drive electronics. The A/N monitor electronics includes apparatus responsive to the supplied sync pulse for the purposes of generating an internal vertical sync pulse in synchronism with the applied vertical sync pulse. In a preferred embodiment, the data to be displayed on the A/N monitor is provided by a computer. The computer determines the appropriate data to be displayed in response to operator or system requests and generates the data by commanding display of particular A/N characters, which characters are stored in a digital memory. The characters are read from memory at a rate and time determined by a character clock signal. The characters are generated in a predetermined video format and vertical and horizontal sync signals are added to the format to create a composite video signal. In order to synchronize the A/N monitor operation, i.e., the vertical retrace time, with the image monitor operation, the stripped vertical sync pulses from the image data are compared to the vertical sync pulses for the A/N data. Any difference in phase and frequency of the two trains of vertical pulses is used to adjust the frequency of a clock, which clock generates the character clock signal and the vertical and horizontal sync pulses for the A/N date. In this manner, the A/N video data display is synchronized to the image data display such that vertical retrace cycles in both monitors occur substantially simultaneously.

DESCRIPTION OF THE DRAWINGS

For a better understanding of the present invention, reference may be had to the following detailed description taken in conjunction with the accompanying drawings in which:

FIG. 5 is a sync signal timing diagram; and

DETAILED DESCRIPTION

Figure 1:
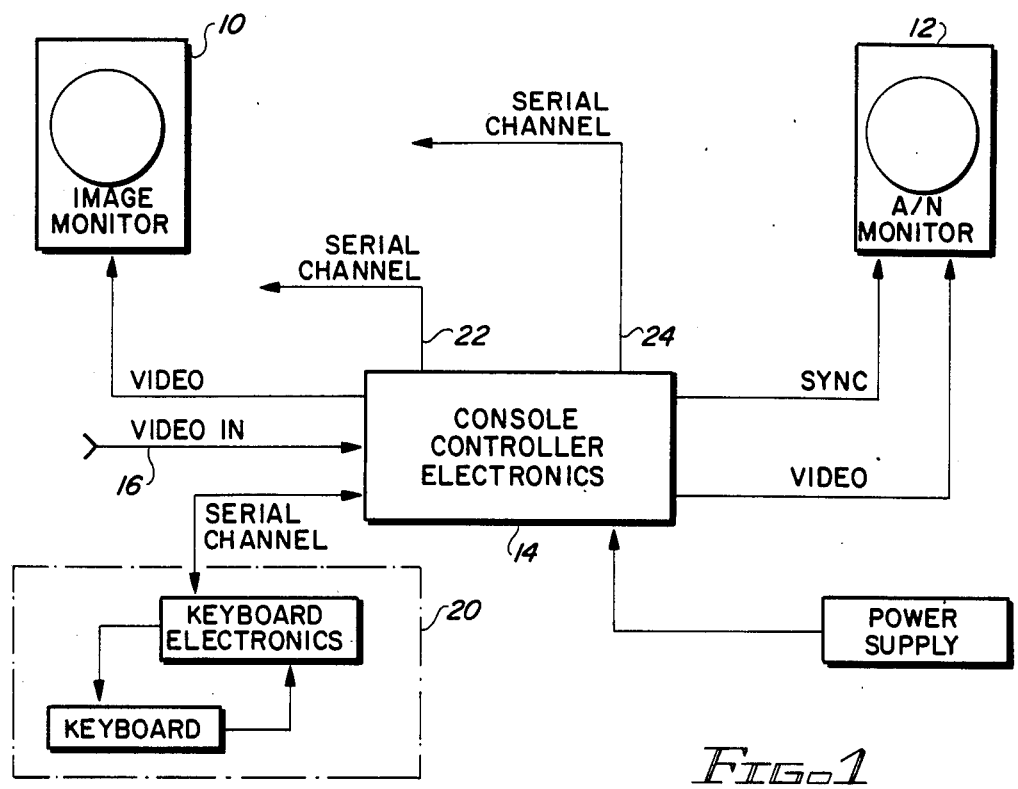
FIG. 1 is a simplified block diagram of a system employing an image monitor and an alpha-numeric monitor coupled together.

Referring first to FIG. 1, there is shown a highly simplified block diagram illustration of a video image monitor coupled to operate in conjunction with an alpha-numeric (A/N) video monitor in a medical x-ray system. The image monitor 10 is connected to present a standard video presentation using 525 lines per frame wherein each frame comprises two fields of 262 scan lines each. The alpha-numeric monitor 12 is also a standard video monitor but is connected for displaying alpha-numeric characters at a different frame rate. Whereas the image monitor 10 displays a single frame comprising two interlaced fields, the A/N monitor displays data in a non-interfaced format having a single field per frame since the image quality from the alpha-numeric monitor 12 is not required to be as high as the image quality on the video image monitor 10. A/N monitor 12 may also utilize a different number of horizontal scanlines per frame. In the system illustrated in FIG. 1, the video image monitor 10 may be connected to present video data compiled from x-ray images of some portion of a person's body. Accordingly, in order to afford adequate and accurate representation of such image, the quality of the image on the monitor 10 must be extremely high. Any disturbance of that image such as by the electromagnetic field generated by the monitor 12 may result in difficulty in diagnosing or determining any particular problem with the person whose image is being examined. Since the overall system shown in FIG. 1 represents a commercially available system such as that available from General Electric Company under the designation of Model DF5000 P/C digital fluorography system, the description of FIG. 1 will only be given in very general terms as a system with which the present invention is particularly useful.

The console controller electronics block 14 represents an interface between an alpha-numeric input terminal illustrated as a key board and key board electronics block 20 and the A/N monitor 12. The system is arranged such that the input signals received from the keyboard electronics block 20 are displayed on the monitor 12 and are also coupled via lines 22 and 24 to a control system (not shown) effecting a video signal supplied on a line 16. For example, an operator can command the x-ray system to present different views or different sections of a view on the image monitor 10 and the particular section or view which is being displayed on the image monitor 10 will be identified by alpha-numeric characters on the monitor 12 such that the operator can always determine exactly what is being viewed on the image monitor 10.

In the system of FIG. 1, it is necessary that the image monitor 10 and alpha-numeric monitor 12 be positioned relatively close together such that a person viewing an image display on image monitor 10 can also view the data appearing on monitor 12 so as to always be aware of exactly what image is being presented on the monitor 10. Because these monitors are necessarily positioned close together, the electromagnetic field generated in one monitor, if not properly shielded, will disturb the display on an adjacent monitor. In the case of the alpha-numeric monitor 12, any interference from video monitor 10 may be noticeable but is not detrimental since only gross information is required from the monitor 12. However, any interference from monitor 12 reflected into monitor 10 is of significant concern since such interference may impair the ability of a medical expert to identify or diagnose a particular problem. The prior art solutions to this interference problem have involved primarily utilization of mu-metal shielding around the neck and electromagnetic circuits of the cathode ray tubes within the monitors 10 and 12.

Through investigation of the phenomenon of interference between closely positioned cathode ray tube display devices, applicant's have found that the primary interference is caused by the vertical retrace operation of the cathode ray tube (CRT). The horizontal scans and horizontal retrace do not appear to create any visible cross-talk or interference effects. Accordingly, it has been determined that such interference may be minimized by synchronizing the vertical retrace cycles of closely coupled video monitors.

Figure 2:
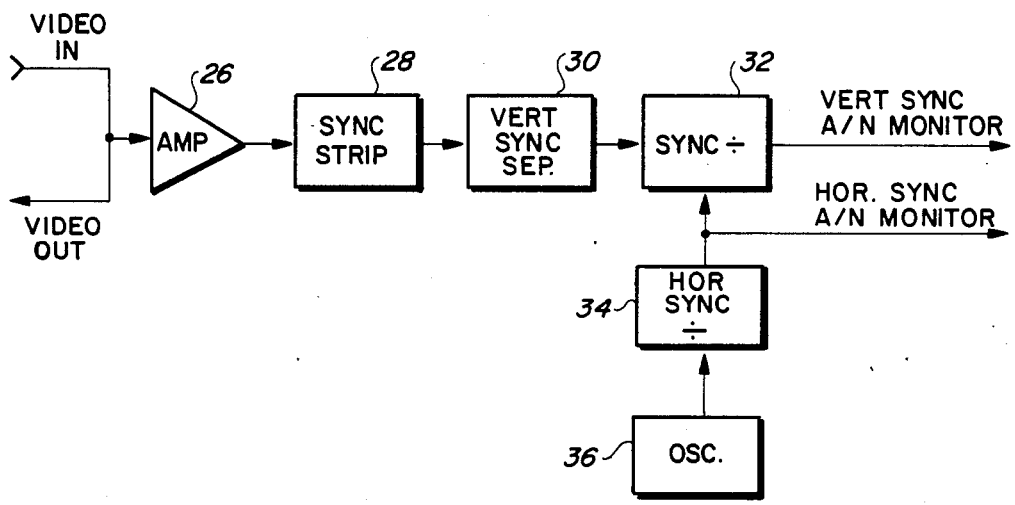
FIG. 2 is a simplified block diagram of one embodiment of the present invention for synchronizing the vertical retrace cycles of adjacent video monitors.

Referring now to FIG. 2, there is shown one method of eliminating the interference between closely coupled video monitors by synchronizing vertical retrace cycles of the video monitors using a counter to generate a vertical synchronizing pulse for one monitors in coincidence with a vertical synchronizing pulse generated by another monitor, typically the monitor which has the most critical display. A video input signal which is to be displayed on the video image monitor such as 10 is sensed and amplified in an amplifier 26 and then processed through a sync strip circuit 28. The sync strip circuit is of a type well known in the art for stripping synchronizing signals ("sync signals") from composite video signals and is used in practically every available commercial television set and thus will not be described here. The synchronizing signals stripped from the video signal are then coupled from the circuit 28 into a vertical sync separator 30. The vertical sync separator 30 is also of a type well known in the art for stripping vertical sync signals from other synchronizing signals in the standard video signal such as, for example, horizontal sync signals. The vertical sync pulses from the sync separator 30 are then coupled to a reset terminal of a counter 32. The counter 32 is connected to count horizontal synchronizing signals which are developed by a horizontal sync circuit 34. The horizontal sync circuit 34 is driven by an oscillator 36 running at a fixed frequency. Circuit 34 includes a divider to divide the fixed frequency oscillator pulses down to an appropriate scan rate to be supplied to the alpha-numeric monitor 12. The horizontal sync signals generated by the horizontal sync circuit 34 are supplied to the alpha-numeric monitor 12 for generating horizontal scan lines. The horizontal sync pulses are also supplied to an input terminal of the counter 32 which counts the horizontal signals. The horizontal sync signals are shown as being separately developed rather than taken from the composite video signal from amplifier 26 since the horizontal scan rate for the A/N characters may be different than the rate for image video.

The counter 32 is set to provide a vertical sync signal after every vertical frame providing the input signal (from sync separator 30) on its reset terminal is at a logical one level. If the signal at the reset terminal is at a logic zero level, the counter will continue to count and will not generate a vertical sync signal for monitor 12. As is well known, the loss of a vertical sync signal within a video monitor will produce a picture which "rolls" continuously.

In order to synchronize the generation of the vertical sync signal for the alpha-numeric monitor 12 with the vertical sync signal supplied to the video image monitor 10, the vertical sync signals from the sync separator 30 force the reset terminal to a logical one for the duration of each one of such vertical sync signals. Referring briefly to FIG. 5, there is shown timing diagrams for the vertical sync signals stripped from the input video and a sequence of horizontal sync signals generated by the horizontal sync circuit 34. As can be seen, upon coincidence of a vertical sync signal A from sync separator 30 and a horizontal sync pulse B from circuit 34, the counter 32 will be reset and generate a vertical sync signal C for the alpha-numeric monitor 12. Accordingly, this circuit of FIG. 2 provides one method of synchronizing the vertical retrace cycles of a video image monitor 10 and an alpha-numeric monitor 12.

Figure 3:
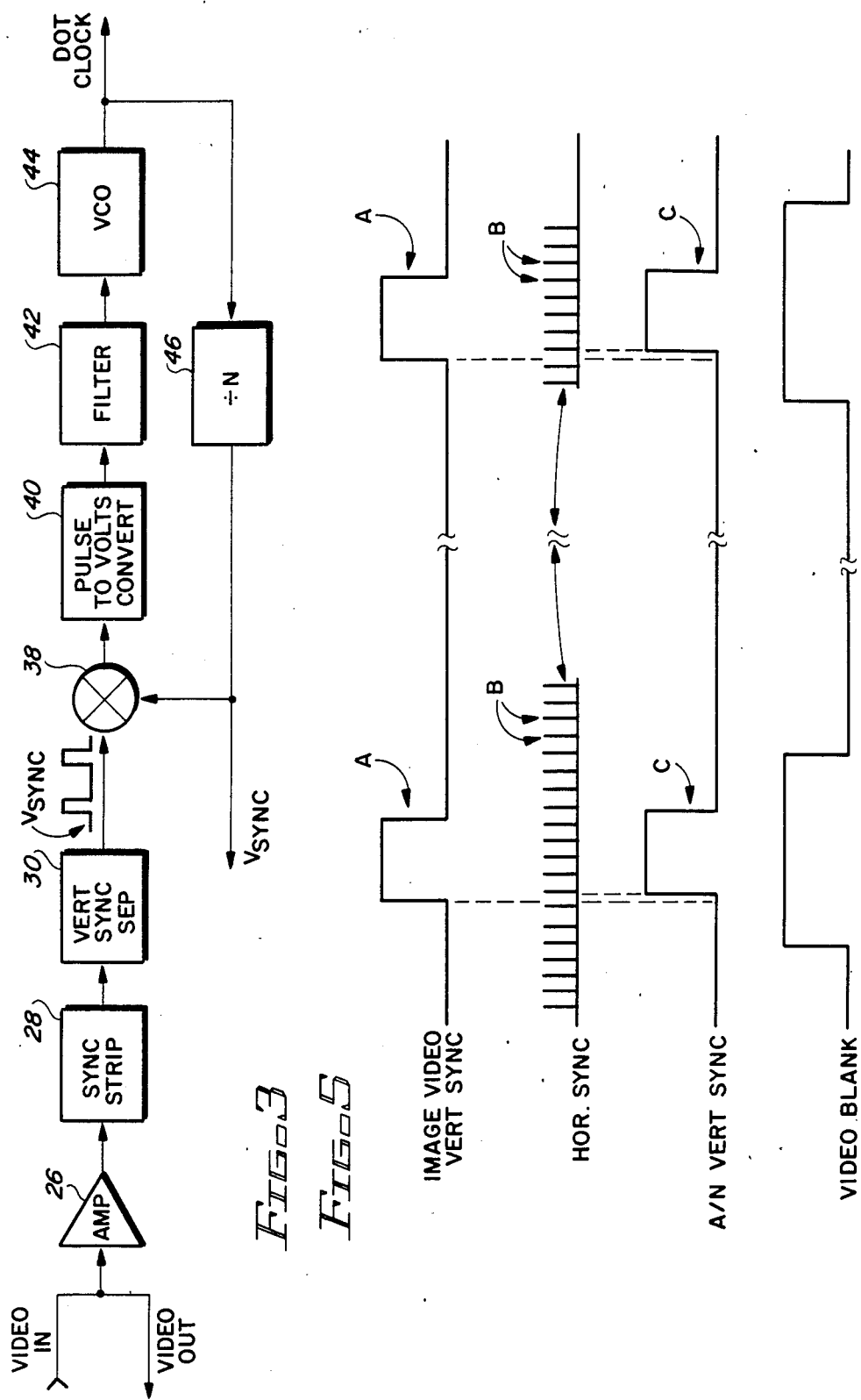
FIG. 3 is an alternate embodiment of the present invention for synchronizing vertical retrace cycles of closely coupled CRT's.

FIG. 3 is an alternate embodiment of the present invention in which a phase locked loop is used to synchronize the vertical sync signals for the alpha-numeric monitor 12 to the vertical sync signals for the video image monitor 10. In this embodiment, the vertical sync signals from vertical sync separator circuit 30 are applied to a comparator 38 which may be, for example, a phase and frequency comparator such as a digital logic circuit which is set by a signal on one terminal and reset by a signal on another terminal. Digital phase and frequency comparators are well known and will not be described herein. The time difference between the vertical sync signal from sync separator 30 and a generated vertical sync signal results in an error signal which is applied to a digital-to-analog converter or a pulse-to-voltage converter 40. The converter 40 generates an analog signal which is filtered through a filter 42 and applied as a control signal to a voltage controlled oscillator 44. The voltage control oscillator 44 generates clock signals which are preferably at a higher repetition rate than is necessary for the horizontal sync signals. The clock signals can be used for "dot" generation in the A/N monitor 12. The clock signals are divided by a fixed count in a divider circuit 46 which may be, for example, a register which is reset after a predetermined number of counts. The output of the circuit 46 is a vertical sync signal for the monitor 12. This phase locked loop solution to the synchronization of the vertical sync signals for two adjacent monitors achieves the same result as the counter solution illustrated in FIG. 2.

Figure 4:
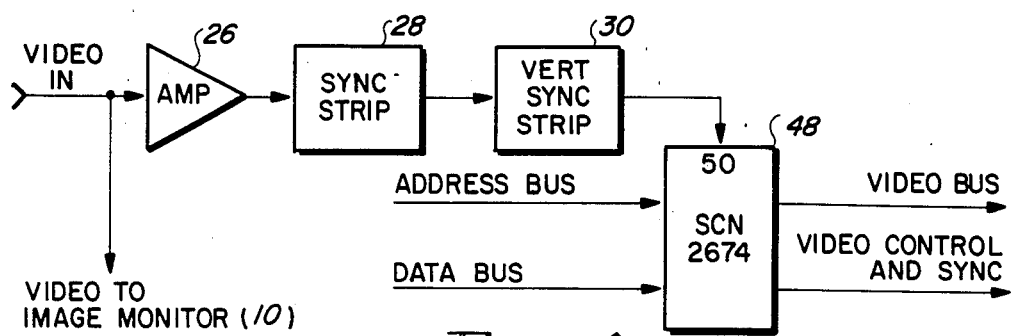
FIG. 4 is a partial block diagram of a preferred implementation of the vertical retrace synchronization in accordance with the present invention.

Referring now to FIG. 4, there is shown a preferred implementation of the present invention utilizing an advanced video display controller 48. The same basic sync strip circuits 28 and 30 are utilized to obtain the vertical sync signals. However, the vertical sync signals are now coupled to a line lock input terminal of the video display controller 48. The video display controller is preferably a Signetics Corporation type SCN-2674 advance video display controller which is a programmable device designed for use in CRT terminals and display systems that employ raster scan techniques. The controller 48 generates the vertical and horizontal timing signals necessary for the display of data on a CRT monitor such as monitor 12. The associated circuitry necessary to utilize the controller 48 in a video processing system is disclosed in Signetics Corporation publication 98-8026-740A published in 1983. In the controller 48, the stripped vertical sync signals are applied to an AC line lock input terminal 50. If the signal at the input terminal 50 is at a logical zero level after a programmed vertical front porch interval of a standard video signal, the vertical front porch interval will be lengthened by increments of horizontal scan line times until the signal at terminal 50 goes to a logical one level. In essence, this operation is substantially identical to the counter approach described above with respect to FIG. 2. The controller 48 serves the purpose of synchronizing the presentation of data on the monitor 12 and assuring that the vertical retrace cycle occurs in synchronism with the vertical retrace pulse appearing at the terminal 50.

Figure 6:
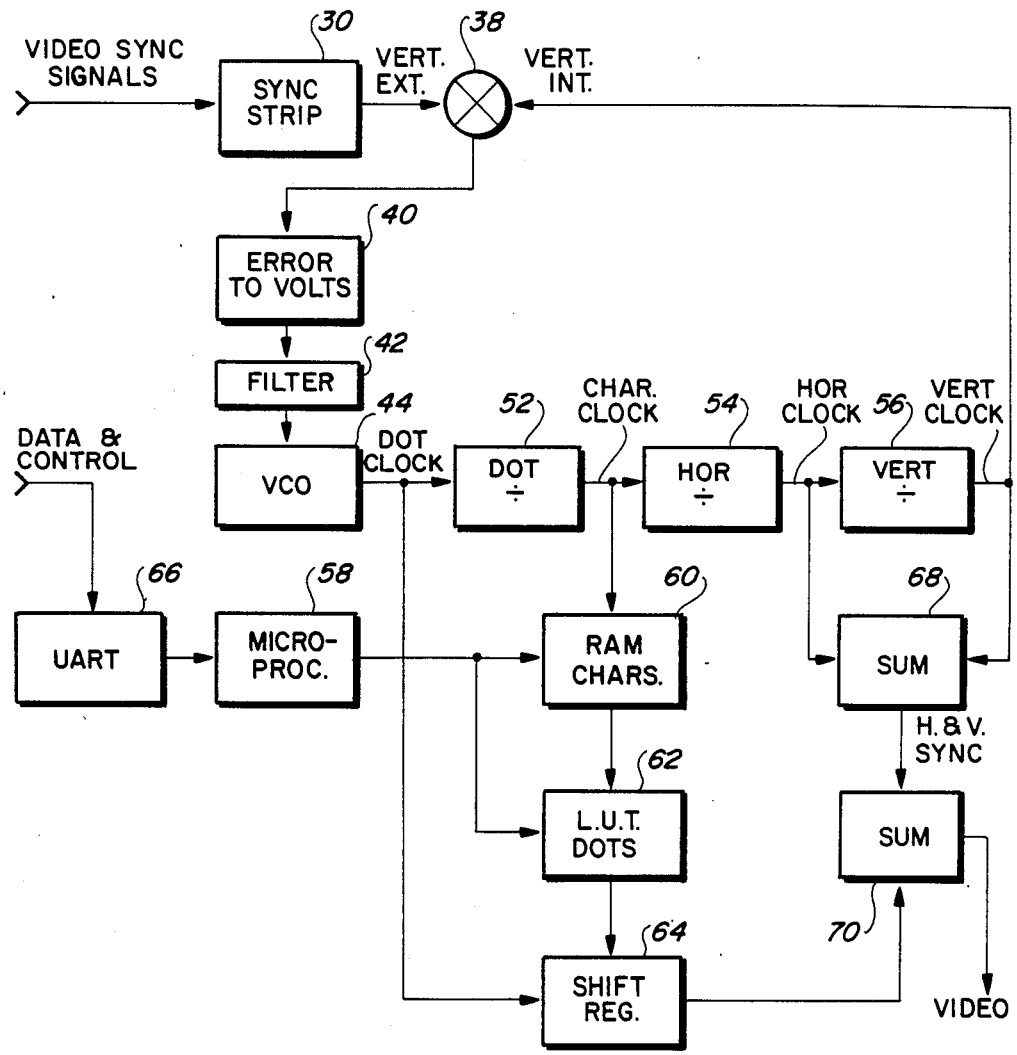
FIG. 6 is an expanded diagram of the system implementation of FIG. 3.

Referring now to FIG. 6 there is shown a more detailed implementation of the present invention including formation of a composite video signal having vertical sync signals synchronized to an external video signal. The apparatus of FIG. 6 comprises a video signal generating system with an adjustable sync signal generator such as that shown in FIG. 3. This arrangement allows video signals from two unrelated and unsynchronized sources to be synchronized. The phase lock loop (PLL) circuit of FIG. 3 is essentially unchanged in the expanded version of FIG. 6 wherein the multiple divider circuits 52, 54 and 56 form the previously shown divider circuit 46. The elements 30, 38, 40, 42 and 44 are the same as disclosed above.

The PLL circuit is illustrated as an integral part of a system for generating alpha-numeric display data. Basic control of the system is through a microcomputer 58 which contains appropriate programming and address and data busses for communicating with a random access memory (RAM) 60 and a look up tabel (LUT) memory 62. The RAM 60 is used as an alpha-numeric character memory while LUT 62 contains data for converting characters to corresponding dot patterns which can be displayed by a scanning electron beam. The dot pattern data is transferred from LUT 62 to a shift register 64 from whence they can be clocked out at the dot clock rate for summation into a composite video signal. The communication between the control electronics and external keyboard entries is through a universal interface (UART) 66. The character generation circuit is not considered novel per se and is typical of that used in most A/N display systems. The details of the construction and operation of character generation may be obtained by reference to such prior art systems. The inventive feature of the illustrative system is the recognition of the cause of the interference between closely positioned video monitors and the solution of that problem by synchronizing the vertical retrace cycles.

The character read-out rate from RAM 60 is set by a character clock signal (CHAR. CLK.) from divider circuit 52 which divides the dot clock frequency set by VCO 44 to a lower frequency. The horizontal retrace sync signals are produced by divider circuit 54 which divides the character clock frequency to a corresponding lower scan rate frequency. The vertical sync signals are generated after a predetermined number of horizontal scan lines by the divider circuit 56. Since the composite video signal for the A/N monitor 12 must contain both horizontal and vertical sync signals, the respective output signals from divider circuits 54 and 56 are summed in a circuit 68. The dot signals from register 64 are then summed with the sync signals in summing circuit 70 to form the composite video signal for display. It will be immediately apparent that since the VCO 44 is controlled such that the generated vertical sync signal (VERT. INT.) is synchronized with the external vertical sync signal, the presentation of the alpha-numeric data and operation of A/N monitor 12 will be synchronized to the operation of monitor 10.

It will be appreciated that what has been disclosed is an improved method and apparatus for avoiding and eliminating interaction between closely coupled or positioned cathode ray tubes in video monitors. The improved method eliminates the prior art requirements of extensive magnetic shielding around cathode ray tubes in order to prevent such interaction. Applicants have made a significant contribution to the prior art in discovering that the primary interaction between closely coupled CRT's is due to the vertical retrace function and independent of horizontal retrace times. Accordingly, it is intended that the invention not be limited to the specific disclosed embodiments since modifications will become apparent to those skilled in the art and therefore, the invention is to be limited only by construction of the appended claims in accordance with the spirit and scope of the invention.

We claim:

1. A method for eliminating visible electromagnetic interaction between cathode ray tube video monitors positioned in close proximity and each displaying a different set of image data including horizontal and vertical sync signals respectively from unsynchronized video sources, at least one of the sources having an adjustable sync generation circuit, and an other of the sources providing one of the sets of image data including horizontal and vertical sync signals, comprising the steps of:
- (a) obtaining first vertical synchronizing signals from the image data from the other of the sources;
- (b) obtaining second vertical synchronizing signals from the adjustable video sync generation circuit;
- (c) comparing the first vertical synchronizing signals to the second vertical synchronizing signals for deriving a control signal indicative of at least one of the phase and frequency difference between said first and second vertical synchronizing signals; and
- (d) applying the control signal to the adjustable video sync generation circuit in a manner to minimize the phase and frequency difference of the vertical sync signals without synchronizing the horizontal sync signals in the sets of image data.

2. A system for synchronizing vertical retrace cycles of an alphanumeric (A/N) video display monitor with vertical retrace cycles of a video image display monitor for eliminating electromagnetic interference between closely positioned cathode ray tube display monitors, the A/N monitor being connected for receiving alphanumeric video signals at a first horizontal scan rate and the image display monitor being connected for receiving image video signals at a second horizontal scan rate, the system comprising:

means for detecting the image video signals coupled to the image monitor and for obtaining therefrom image video vertical sync signals;

controllable clock means for generating a first clock signal at a controllable repetition rate;

means responsive to said first clock signal for generating periodic A/N video vertical sync signals;

means for coupling said A/N video vertical sync signals to said A/N monitor for initiating a vertical retrace cycle;

means for comparing the time of occurrence of each of said image video vertical sync signals to the time of occurrence of corresponding ones of said A/N video vertical sync signals and for generating an error signal representative of any time or occurrence difference therebetween; and means for applying said error signal to said controllable clock means for adjusting said repetition rate in a manner to minimize said error signal.

3. The system of claim 2 and including:

means for storing the A/N video signals to be displayed on the A/N monitor;

means for developing from said clock means a second clock signal for clocking said A/N video signals from said storing means at a rate suitable for display on the A/N video monitor;

means for deriving from said periodic A/N vertical sync a horizontal sync signal for initiating horizontal scan lines on said A/N monitor;

means for synchronously summing said A/N video signals and said A/N horizontal and vertical sync signals for providing a composite video signal for the A/N video monitor.

4. The system of claim 2 wherein said storing means comprises a random access memory, said second clock signal being applied to said memory for clocking A/N characters sequentially from memory.

5. The system of claim 4 wherein said storing means includes a look up table memory for converting each of said A/N characters to a corresponding dot pattern signal for the A/N monitor.

* * * * *